March 10, 1964 R. R. COSNER 3,123,997
UNIVERSAL HARDNESS TESTER
Filed May 9, 1960 2 Sheets-Sheet 1

INVENTOR
ROBERT R. COSNER
BY Howard K. Kothe

ATTORNEY

INVENTOR.
ROBERT R. COSNER

United States Patent Office 3,123,997
Patented Mar. 10, 1964

3,123,997
UNIVERSAL HARDNESS TESTER
Robert R. Cosner, South Charleston, W. Va., assignor to Union Carbide Corporation, a corporation of New York
Filed May 9, 1960, Ser. No. 27,768
2 Claims. (Cl. 73—81)

The present invention relates to a method and apparatus for testing the hardness of materials by measurement of the force required to indent a specimen of the material to be tested to a predetermined and reproducible amount, and, more particularly, to a method and an apparatus for use with materials testing machines which permits hardness measurements on a wide variety of materials and yields a continuous index of quantitative hardness values, thereby permitting direct comparison of the hardness qualities of materials over a wider range of materials than has been hitherto possible with any known hardness testing method or apparatus.

Qualitative hardness is one of the most readily discernible charactertistics of matter, but its definition is multiform and an accurate method and device for its quantitative evaluation, applicable to a wide variety of engineering materials, has long been sought by industry. Probably the most all-embracing definition of the hardness of a material is to say that its hardness is a measure of its resistance to deformation. Materials which are said to be hard, in a general sense, manifest this quality by relatively high resistance to wear, cutting, abrasion, indentation and penetration. Because of the diverse forms in which resistance to deformation is manifested, a variety of testing methods and apparatuses have been tried. Early developed tests, some of which are still used, characteristically involve the skill and experience of the tester and yield results which are at least partially subjective and which are difficult to standardize. The more recently developed testing techniques involve indenting or penetrating the specimen and measuring the indentation or penetration and the load used to cause it. Although these later tests are more objective, results are, as with the earlier tests, difficult to standardize and no completely satisfactory hardness tester applicable to a wide spectrum of materials, was known prior to the present invention.

The principal reasons that the presently used hardness test methods and apparatus are restricted to relatively limited ranges of materials are that a predetermined load may fail to produce a measurable indentation or, conversely, may produce an indention or a penetration so great that measurement becomes impractical. In addition, accuracy of the results of the presently used tests is affected by the fact that the degree of indentation differs from one material to another, a softer material being indented to a greater extent than a harder material for a given loading condition. This variation in the extent of indentation results in stress conditions at and near the deformation location which are not necessarily proportional to the applied load. Thus it cannot be said with certainty that a material which permits two times the deformation than does another material, under the same load, is necessarily one half as hard. The wide disparity of the numerical scales of presently used hardness tests values also makes it very difficult for the designer or engineer who must specify a desired degree of hardness to visualize the relative hardness of the materials under consideration. Specification of a desired quantitative hardness cannot be made without correlative reference to the particular hardness test most applicable to the spectrum of materials in which the desired hardness is found.

Despite the importance of hardness as one of the principal parameters governing selections of engineering materials, industry is handicapped by a complicated array of test methods and a multiplicity of numerical scales for the quantitative evaluation of this property. Thus, prior to the present invention there has been a need in the art for a superior hardness tester.

The present invention overcomes all of the aforementioned limitations inherent in currently known hardness tests and apparatus therefor. The apparatus of this invention can be used in cooperation with any standard commercially available load testing machine which permits preselection of a definite amount of travel of a moving crosshead portion and which has means to indicate or record load.

The present invention is based upon the principle of indenting all materials to identically the same degree and measuring the load required to accomplish this indentation. By testing in this manner, the strain conditions induced by the indentation are identical; thus all materials tested receive the same external treatment. The load is measured at the instant when indentation is completed. In this manner, the loads required to accomplish the preset travel and consequent indentation of the specimens automatically are indicative of hardness. For example, the load required to cause a specified indentation in something relatively soft, such as butter, might be, hypothetically, 0.001 pound. The load required to produce the same specified indentation in a high alloy steel might be, hypothetically, 1 pound. Thus, both these loads may be taken as hardness numbers and it may be factually stated that the high alloy steel is 10,000 times as hard as butter. The advantages of a hardness test which permits such direct comparison of a very wide variety of materials are obvious.

In general, the apparatus of the present invention comprises two complementing yokes which are slideably cooperable in such a manner that a platen, fitted with an indenter probe and rigidly secured to the first yoke, can be moved into contact with a specimen table platen, rigidly secured to the second yoke, whereby test specimens placed on the specimen table platen will be indented.

The invention also comprises novel details of construction and novel combinations of components, together with other features and results which will be more apparent from the following description. The drawings merely show and the description merely describes preferred embodiments of the present invention which are given by way of illustration.

While the embodiment of the invention shown on the drawings illustrates the use of the apparatus of the present invention in conjunction with a testing machine which is set up for tensile testing, with minor modifications, my apparatus could also be employed with a testing machine which is set up for compression testing. Should it be found more convenient to employ the latter type machine for hardness testing in accordance with my invention, the hardness tester assembly would be much simpler than that shown in the embodiment of the drawings. It would consist merely of two jaw pins, one holding the indenter and the other supporting the specimen table.

Figure 1:
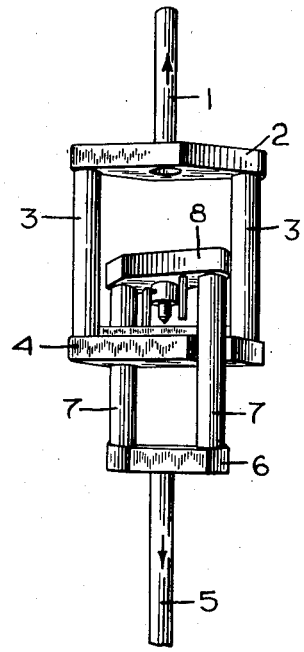
FIGURE 1 is a perspective view of an embodiment of the hardness testing apparatus of the present invention adapted for operation in a tensile testing machine.
Figure 2:
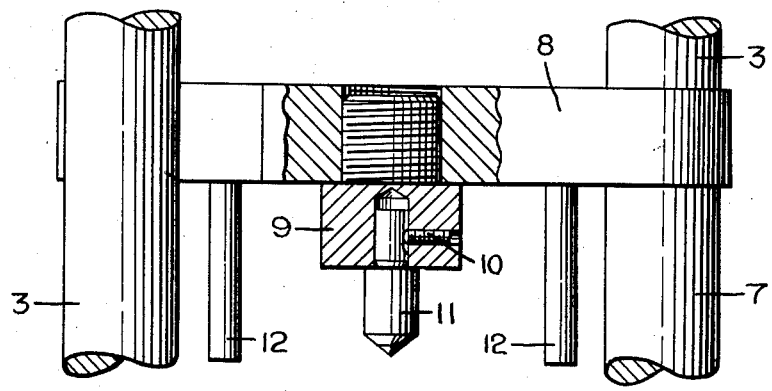
FIGURE 2 is a partially broken away detail view of the indenter probe portion of the hardness tester.

In the embodiment of the invention shown in the drawings, particularly FIGURES 1 and 2, the upper yoke comprises top yoke jaw pin 1, top yoke arm 2, top yoke spacer rods 3 and specimen table 4 which constitutes a specimen holding means. The lower yoke comprises bottom yoke jaw pin 5, bottom yoke arm 6, bottom yoke spacer rods 7, probe retainer base 8, probe retainer 9, diamond point probe 11, set screw 10, and stop pins 12.

When assembled, the two yokes provide an arrangement which permits the specimen table and the indenter probe to come together as the two jaw pins are pulled apart in the directions indicated by the arrows. Stop pins 12 are arranged to keep diamond point probe 11 from indenting specimen table 4 in the event of a control malfunction.

Not shown but used in conjunction with the present invention, is a hardened steel wafer approximately three-eights of an inch in diameter and approximately one-eighth of an inch thick, with the thickness known precisely, preferably to within 0.0001 inch. Although this component is here described as a disc for illustrative purposes, it may be of any thickness and planform shape which can conveniently be placed in and removed from the space between specimen table 4 and diamond point probe 11, as bounded by stop pins 12. It will be obvious from the ensuing description that the disc or its equivalent is not essential to the operation of my invention but is a means to attain a relatively higher degree of testing precision by attenuating the abberative effects of physical irregularities on the surface of the sample to be indented.

The testing procedure is commenced by the installation of the hardness tester in a load testing machine 13. For the embodiment of the invention shown in the drawings, the load testing machine 13 is one adapted for tensile loading. The specimen of material to be tested should possess two substantially parallel flat surfaces. The specimen is placed on the specimen table 4, and the previously described hardened steel wafer is placed on the top of the specimen directly below the probe 11. The testing machine control is then operated to select the most sensitive load recording and sensing range. The load testing machine is then operated to bring the hardness tester probe 11 downward until it impinges against the hardened steel wafer. As soon as this contact is indicated by a slight reaction on the load indicator or recorder 31, the movement is stopped. This preliminary movement will not indent the test specimen, since the area of the hardened steel wafer is many times larger than the point of probe 11, and the load indicating the initial contact between the probe 11 and the hardened steel wafer is extremely small. With its movement stopped at the instant of this initial contact between the test probe and the wafer, the travel control of the testing machine is set to zero, to indicate the position at which the test will commence. The machine is then operated to raise the probe 11 a distance sufficient to permit removal of the hardened steel wafer from the test specimen. With the wafer removed, the probe is returned to the position in which it made contact with the wafer, this position being precisely determined by the zero-setting made at that time. The travel control of the testing machine is then set to move a distance consisting of the desired indentation depth plus the known thickness of the hardened steel wafer. For example, if the standard indentation will be 0.010 inch and the wafer is known to be 0.1250 inch, the travel control must be set for movement of 0.1350 inch. The test movement is then commenced and is automatically stopped after a travel of 0.1350 inch. The load applied to complete the preselected travel distance can be obtained from the indicator or recorder 31 apparatus which is employed in conjunction with the load testing machine and may be taken as a hardness value for the material tested. Naturally, the depth of the indentation and the thickness of the material specimen to be tested have correlative bearing, one on the other. Determination of the minimum indentation depth is governed by the degree of accuracy with which the travel of the testing machine can be controlled and the determination of the maximum indentation depth depends upon the geometry of the indenter probe used. The preferred range of indentation depths is from 0.005 inch to 0.030 inch. While, other than the requirement that it possesses two substantially flat parallel surfaces, there are no critical limitations on the size and shape of a specimen to undergo test. Its thickness should be sufficient to take the penetration chosen for the test and it should, like the wafer described above, be of such proportions that it can readily be placed in and removed from the space between specimen table 4 and diamond point probe 11, as bounded by stop pins 12.

In order to subject all materials tested to the same external treatment either the loading time rate or the velocity of indentation should be maintained constant for any particular series of tests. In either case, in order to avoid introducing impact effect into the test results, the preferred maximum velocity of indentation is in the order of five inches per minute.

Figure 3:
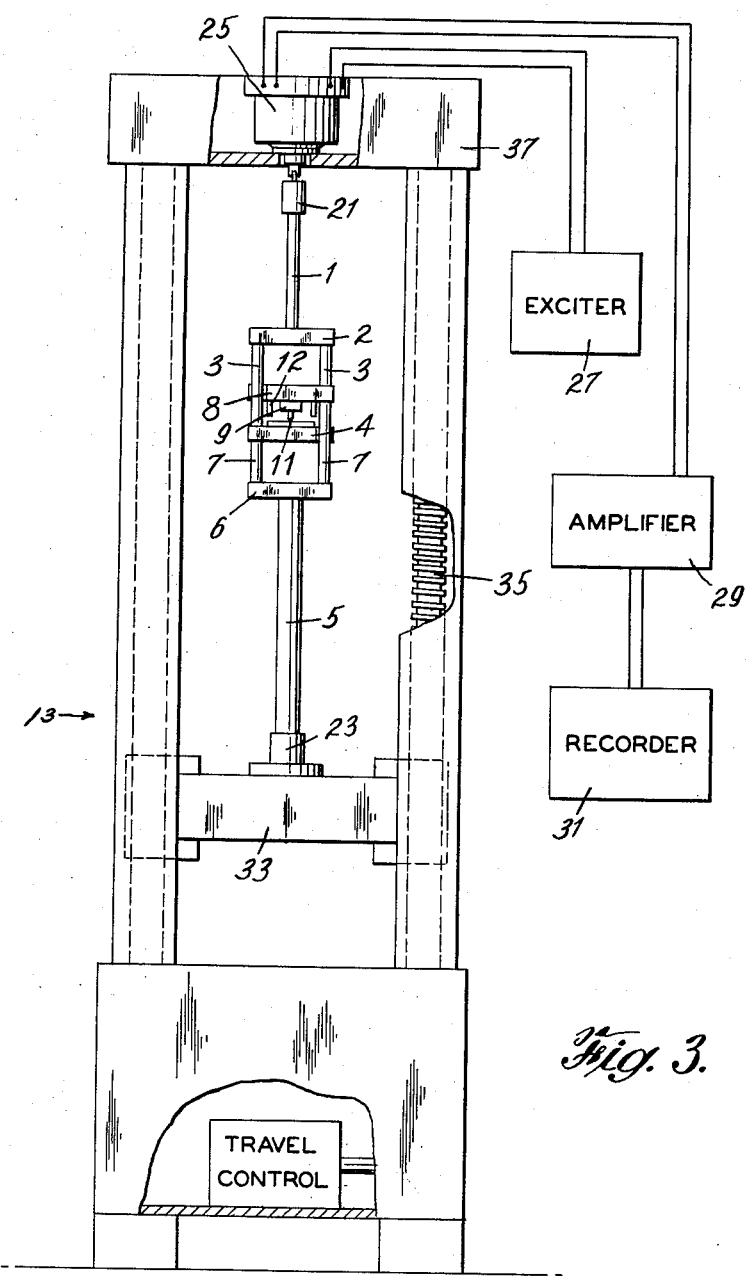
FIGURE 3 is an elevational and block diagram view of apparatus according to the present invention installed in a conventional tensile testing machine.

In a specific embodiment illustrated in FIGURE 3 of the drawings, the apparatus shown in the drawings is used in conjunction with a standard commercially available material load testing machine 13 manufactured by the Instron Engineering Corporation, Quincy. Massachusetts, with the jaw pins 1 and 5 of the apparatus fabricated to fit the sockets 21, 23 of said machine. Machine 13 comprises a fixed frame 37; a movable portion 33 adapted to move reciprocally in relationship to the fixed frame 37 on jack screws 35; control and actuating means designated "Travel Control" whereby precise movements of the movable portion 33 may be continually and repeatedly made; means for sensing load data during operation which means includes a conventional four-element strain gauge load cell 25 energized by an exciter 27; an amplifier and recorder arrangement 29, 31 connected to the strain gauge 25 output which arrangement constitutes means for indicating sensed load data; and a pair of specimen holding jaws 21, 23 connected respectively to the strain gauge 25 and the movable portion 33. The probe used is a commercially available standard indenter tipped with an industrial diamond shaped as a cone with a slope angle of 57° with the vertical. The testing machine used in this specific embodiment provides several features of detection and control which facilitate the use of the present invention. The Instron machine incorporates the facility for recording calibrated load versus deflection relationships. The recording is performed automatically and produces a permanent record of the test results. In addition, there is provided a facility called "extension control" which permits the preselection of a definite amount of travel of a moving crosshead on said machine at the completion of which, the moving crosshead will either stop or stop and reverse its direction. This preselection of the testing travel may be made with accuracy of within 0.001 inch.

*Example I*

In one series of tests an indenter penetration of 0.005 inch was selected and eleven material specimens were tested, using the hardness tester in the above described manner. Each specimen was tested ten times. Listed below are the results of these tests with the material, the highest load required to indent, the lowest load required to indent and the average of the ten tests for each material.

| Material | Load required to indent 0.005 inch, pounds | | |
|---|---|---|---|
| | High | Low | Average |
| Stainless steel | 13.00 | 13.00 | 13.00 |
| Structural steel | 12.70 | 12.70 | 12.70 |
| Brass | 12.30 | 12.30 | 12.30 |
| Copper, annealed | 12.00 | 12.00 | 12.00 |
| Aluminum | 10.69 | 10.69 | 10.69 |
| Styrene | 8.20 | 7.80 | 8.10 |
| Acrolein-pentaerythritol resin | 7.50 | 7.20 | 7.34 |
| Epoxy resin | 6.80 | 5.60 | 6.30 |
| Vinly chloride-vinyl acetate copolymer | 6.40 | 6.10 | 6.29 |
| Yellow pine | 1.50 | 0.04 | 0.76 |
| Soft rubber eraser | 0.02 | 0.02 | 0.02 |

*Example II*

In another series of tests an indenter penetration of 0.020 inch was chosen and seventeen materials were tested by the method of the present invention, each ten times.

| Material | Load required to indent 0.020 inch, pounds | | |
|---|---|---|---|
| | High | Low | Average |
| Cobalt tungsten carbide | 184.1 | 184.1 | 184.1 |
| Tungsten chrome vanadium steel | 161.7 | 161.7 | 161.7 |
| Steel test block | 157.5 | 157.5 | 157.5 |
| Tool Steel | 151.2 | 151.2 | 151.2 |
| S.A.E. 1042 Steel | 111.8 | 111.8 | 111.8 |
| S.A.E. 1040 Steel | 107.1 | 107.1 | 107.1 |
| S.A.E. 4140 Steel | 104.6 | 104.6 | 104.6 |
| Nickel base chrome - molybdenum tungsten alloy | 101.4 | 101.4 | 101.4 |
| Carbon Steel | 99.4 | 99.4 | 99.4 |
| Mild Steel | 89.0 | 89.0 | 89.0 |
| Silicon copper alloy | 78.6 | 78.6 | 78.6 |
| Copper, annealed | 77.4 | 77.4 | 77.4 |
| Aluminum | 64.0 | 64.0 | 64.0 |
| Polymethyl methacrylate | 19.5 | 19.5 | 19.5 |
| Epoxy resin | 16.6 | 16.1 | 16.3 |
| Vinyl chloride-vinyl acetate copolymer | 16.1 | 15.8 | 16.0 |
| Polyethylene | 3.1 | 2.6 | 2.9 |

The foregoing examples illustrate the consistency of hardness tests results obtained with the use of the present invention and the capability of the invention to test the hardness of an extremely wide range of materials, which in fact is much wider than has heretofore been possible using the presently available testing methods and apparatus.

The apparatus of the present invention can be used to convert load testing machines to hardness testers which are superior to any known hardness tester. The invention provides a means for determining the hardness of a wide variety of materials and can, therefor, be described as a universal hardness tester. In fact, it makes possible the comparative evaluation of the hardness of virtually all of the materials commonly employed in the fields of engineering, plastics, and the like. For the first time, by employing the present invention, a series of quantitative hardness values which are numerically continuous for all known engineering materials can be obtained. Furthermore, this invention provides a hardness testing method which can be conducted in a straightforward, logical manner and which does not require subjective analysis of its results.

What is claimed is:

1. For use in a materials tensile testing machine having a fixed frame, a movable portion adapted to move reciprocally in relationship to the fixed frame, control and actuating means whereby precise movements of said movable portion may be continually and repeatedly made, means for sensing load data during operation, means for indicating sensed load data, and a pair of specimen holding jaws; a subassembly for performing hardness tests, which subassembly comprises, in combination, a first yoke assembly having a bottom jaw pin adapted to fit one of the specimen holding jaws, a bottom yoke arm transversely affixed to an end of said bottom jaw pin, a probe retainer base disposed parallel to the bottom yoke arm and attached thereto by at least two spacer rods, and pointed probe indenter means attached centrally to the probe retainer base; and a second yoke assembly having a top jaw pin adapted to fit the other of said pair of specimen holding jaws, a top yoke arm transversely affixed to an end of said top jaw pin, and a specimen holding table disposed parallel to the top yoke arm and attached thereto by at least another two spacer rods; said first and said second yoke assemblies being arranged in opposed interlocked slideably cooperable relationship with the pointed probe indenter means of the first yoke assembly subtending the specimen holding table of the second yoke assembly.

2. Apparatus according to claim 1 in combination with a pair of parallel vertically disposed stop pins extending from the probe retainer base adjacent the pointed probe indenter means, said stop pins being of a length greater than the distance of the point of the pointed probe indenter means from the probe retainer base.

References Cited in the file of this patent

UNITED STATES PATENTS

| 1,120,461 | Evans | Dec. 8, 1914 |
| 1,192,670 | Moore et al. | July 25, 1916 |
| 1,452,810 | Moore et al. | Apr. 24, 1923 |
| 1,746,891 | Gogan | Feb. 11, 1930 |
| 2,125,116 | Lewis | July 26, 1938 |
| 2,194,914 | Ruch | Mar. 26, 1940 |
| 2,938,377 | Sklar | May 31, 1960 |